Nov. 10, 1942.    M. TIBBETTS    2,301,344
MOTOR VEHICLE
Filed May 19, 1939

INVENTOR.
Milton Tibbetts
BY
ATTORNEYS

Patented Nov. 10, 1942

2,301,344

UNITED STATES PATENT OFFICE 2,301,344

MOTOR VEHICLE

Milton Tibbetts, Detroit, Mich., assignor to Packard Motor Car Company, Detroit, Mich., a corporation of Michigan Application May 19, 1939, Serial No. 274,584

1 Claim. (Cl. 116—140)

This invention relates to signal devices and more particularly to sound signals for use with vehicles.

The conventional type of electrically operated signal for motor vehicles is designed so that the same kind of sound is made under all driving conditions. When a vehicle is traveling at a high rate of speed, usually on a highway outside of city limits, it is necessary for the signal sound to be of a character such that it will carry a considerable distance and be heard above the wind noises created by movement of vehicles to be passed. This type of sound is unnecessary and undesirable when vehicles are traveling at lower speeds through populated districts.

It is an object of this invention to provide a vehicle sound signal with a mute that automatically becomes effective when the vehicle travels below a predetermined speed.

Another object of the invention is to provide a sound signal with speed controlled means for regulating the type of sound that can be made.

A further object of the invention is to provide a vehicle sound signal that will issue two types of sound, a moderate sound for city driving and a maximum sound for country driving, without any selective operation on the part of the driver.

Other objects of the invention will appear from the following description taken in connection with the drawing, which forms a part of this specification, and in which.

Figure 1:
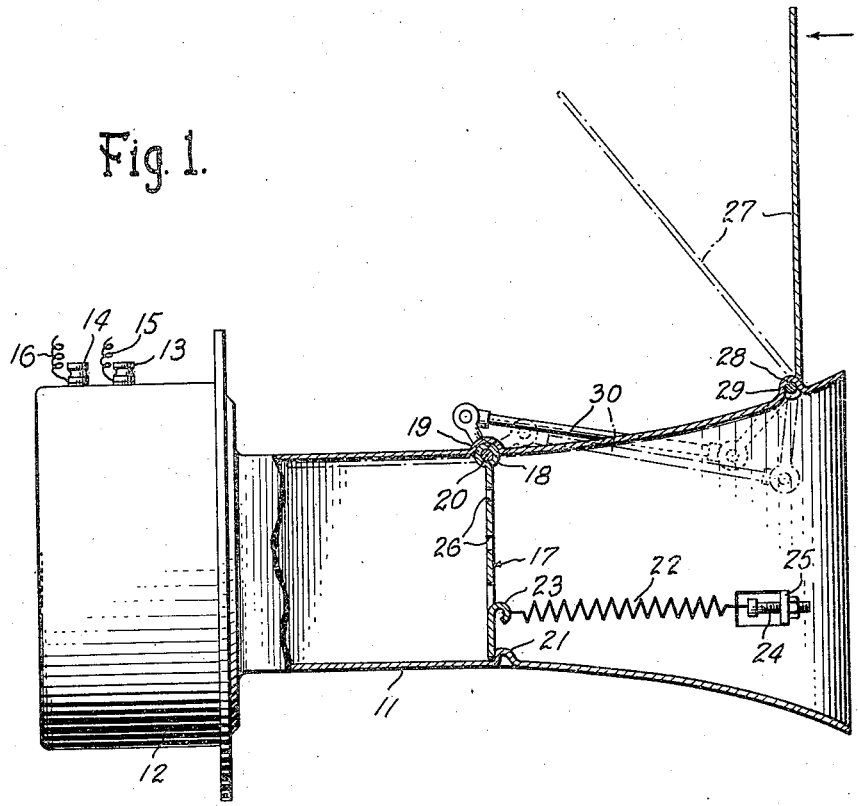
Fig. 1 is a side elevational view, partly broken away, of a sound signal incorporating the invention.
Figure 2:
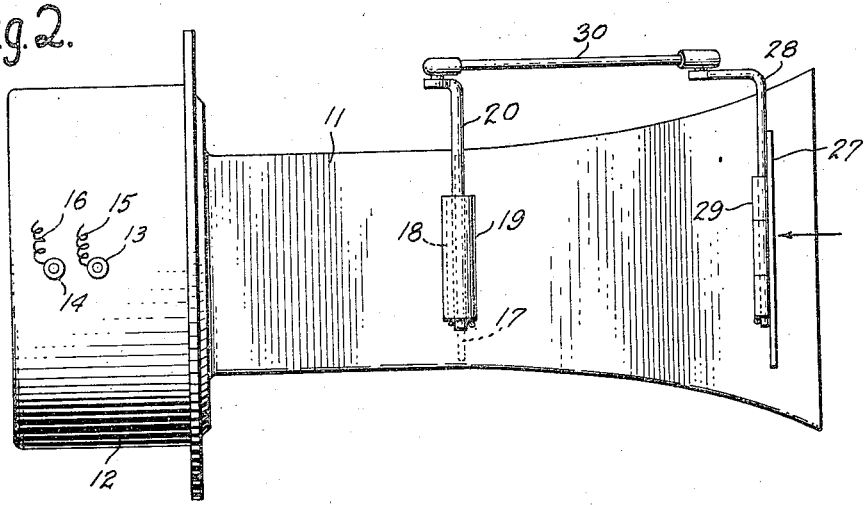
Fig. 2 is a plan view of the sound signal.

The signal device is of a conventional sound type in general use on motor vehicles and consists of a horn 11 and a base 12 in which electrically operated sound mechanism is carried. The terminals 13 and 14 are connected by conductors 15 and 16 with the vehicle battery 10 and provide a circuit in which is arranged a switch 9 under control of the vehicle driver, the circuit and control being of any conventional type.

It is proposed to associate a mute with the signal horn that can be automatically controlled so that the sound will be modified below a predetermined vehicle speed. In the illustrated embodiment of the invention a mute 17 is arranged in the horn and has an eye flange 18 that is swingably mounted in a seat 19 formed in horn. A shaft 20, projecting into the seat and the eye flange, is fixed to the mute and is actuated to swing the mute. A boss 21 on the interior of the horn limits the forward movement of the mute and is arranged so that the mute traverses the interior of the horn when engaged thereagainst. Normally holding the mute in such effective position in the horn is a coil spring 22 having one end fastened to a finger 23 struck from the mute and the other end fastened to a bolt 24 adjustably mounted in a bearing lip 25 struck from the horn.

The horn may be square in cross section and the mute may be made to fit it. The mute can have a suitable number of openings as at 26 therethrough to modify the normal sound of the signal to the degree desired. Pressure exerted by the spring will hold the mute in effective position, as indicated in full lines in Fig. 1, until overcome by an oppositely acting greater force, and by regulating the position of the bolt 24 the pressure required to overcome the action of the spring may be modified.

The mute is moved into ineffective sound modifying position by mechanism operating responsive to vehicle speed. Such governor means may be a wind-responsive device in the form of a vane 27 fixed to a shaft 28 carried by an eye 29 struck from the horn. A link 30 connects the shaft 28 with shaft 20 so that movement of one will be transmitted to the other. The location of this wind governor is immaterial so long as it is responsive to air pressure resulting from the vehicle movement or the engine fan.

As previously related, the force required to overcome the action of spring 22 to move the mute out of sound modifying position can be regulated as desired. Ordinarily this spring is set to allow the wind governor to move the mute to ineffective position, as shown in dot-and-dash lines in Fig. 1, when the vehicle is traveling at a speed above city limits such as thirty-five miles per hour. Below such predetermined speed the mute will be effective to modify the sound of the signal.

This arrangement of the mute and its control mechanism with the vehicle signal horn will automatically provide a full sound signal for highway travel and a modified sound signal for city travel. The result is accomplished without any further effort on the part of the driver than is required for a single tone signal.

Although the invention has been described in connection with a specific embodiment, the principles involved are susceptible of numerous other applications which will readily occur to persons skilled in the art. The invention is therefore to be limited only as indicated by the scope of the appended claim.

What is claimed is:

The combination with a vehicle signal horn, of means independent of vehicle speed for operating the horn, means for varying the intensity of sound of said horn from one of maximum intensity to one of moderate intensity through a plurality of intermediate intensities whereby the horn may be conditioned to produce when operated one or another of said intensities, governor means responsive to vehicle speed, and means independent of the horn operating means for connecting the governor means to the intensity varying means to condition the horn for any of said intensities dependent upon the speed of the vehicle.

MILTON TIBBETTS.